July 11, 1939.  LE ROY BENNETT  2,165,881
GAUGE
Filed Dec. 7, 1938   2 Sheets-Sheet 1

Inventor
Le Roy Bennett

By Clarence A. O'Brien
and Hyman Berman
Attorneys

July 11, 1939.  LE ROY BENNETT  2,165,881
GAUGE
Filed Dec. 7, 1938  2 Sheets-Sheet 2

Inventor
Le Roy Bennett
By Clarence A. O'Brien
and Hyman Berman
Attorneys

Patented July 11, 1939

2,165,881

UNITED STATES PATENT OFFICE 2,165,881

GAUGE

Le Roy Bennett, Webb City, Mo.

Application December 7, 1938, Serial No. 244,493

1 Claim. (Cl. 33—169)

This invention relates to improvements in gauges, and an object of the present invention is to provide a gauge for use in connection with a micrometer caliper for measuring with precision the depth of a recess, groove, aperture, shoulder, or the like; and the invention together with its objects and advantages will be best understood from a study of the following description taken in connection with the accompanying drawings wherein.

Figure 1:
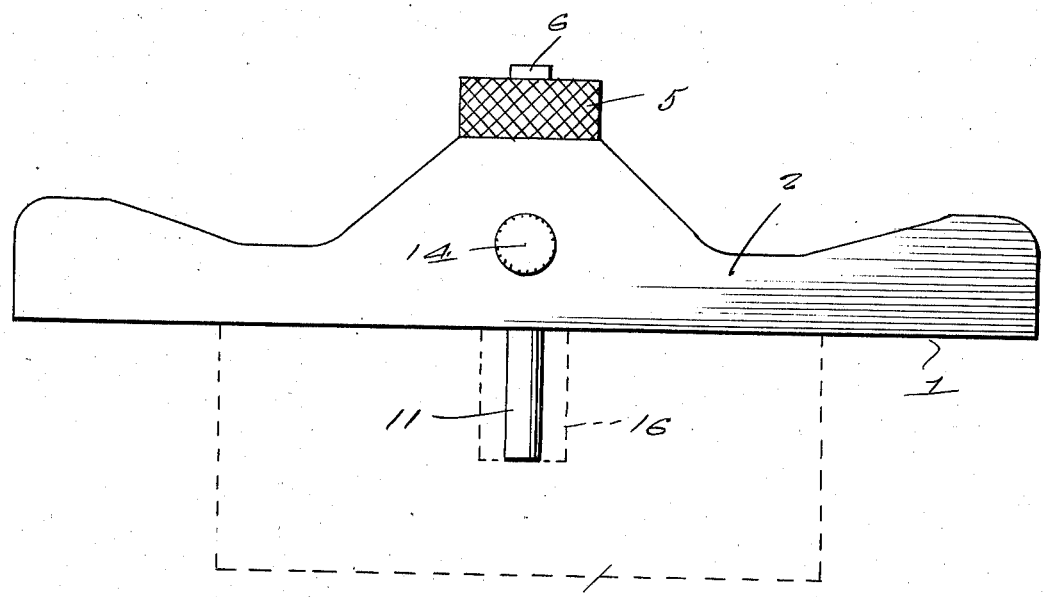
Figure 1 is a side elevational view of the device illustrating one manner of using the same.
Figure 5:
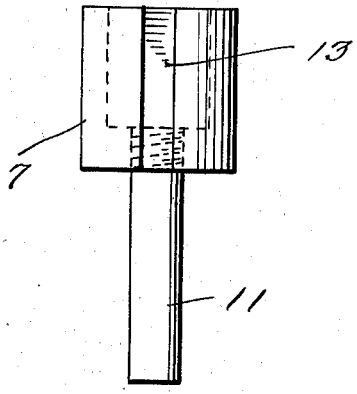
Figure 5 is an elevational view of a slide and a rod associated therewith.
Figure 4:
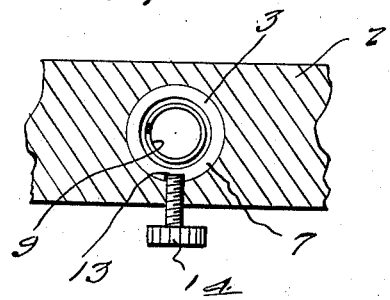
Figure 4 is a fragmentary horizontal sectional view through the gauge.
Figure 2:
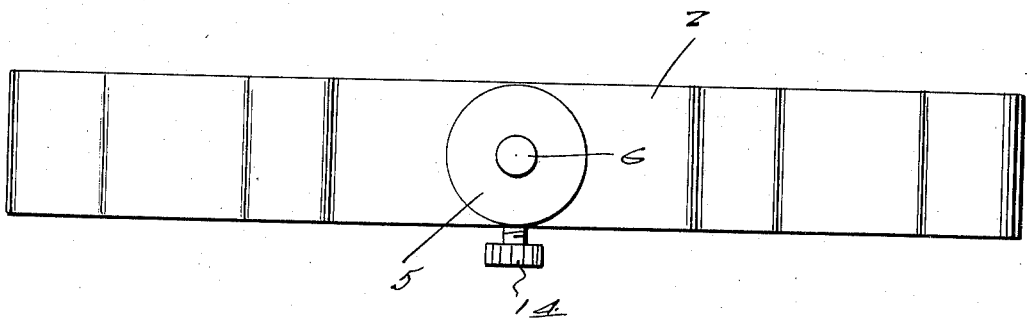
Figure 2 is a top plan view of the gauge.

Referring more in detail to the drawings it will be seen that in the preferred embodiment thereof the gauge comprises a stock 2 of any suitable material, being preferably oblong with the bottom side 1 thereof perfectly flat.

Preferably the ends of the gauge stock 2 are reduced in thickness to facilitate the handling of the same, as shown.

Intermediate the ends thereof the gauge stock 2 is hollowed out to provide therein a chamber 3 having an externally threaded neck 4 for screw-threaded reception of a cap 5. The cap 5 is provided on the crown thereof with a formation 6, the same being in the form of a boss, and the purpose of which will presently appear.

Figure 3:
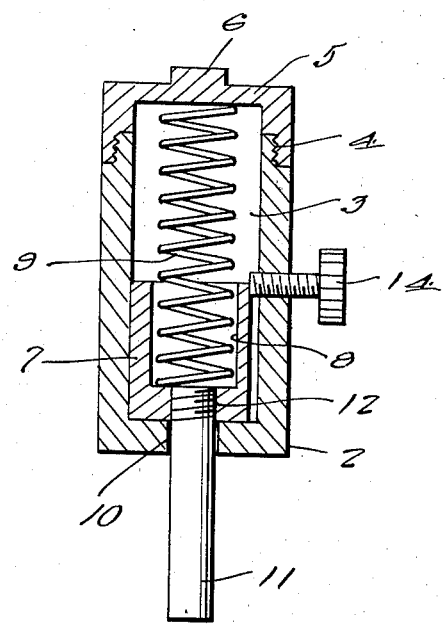
Figure 3 is a vertical sectional view through the gauge.

The chamber 3 slidably accommodates therein a slide member 7 provided with a socket 8 that accommodates one end of a coil spring 9, the other end of the coil spring impinging against the underside of the crown of the cap 5 as shown in Figure 3. Thus the spring 9 acts on the slide 7 to normally urge the same towards the bottom of the chamber 3.

The bottom of the chamber 3 is provided with an opening 10 to accommodate a rod 11 that has an end 12 thereof threaded into an opening provided therefor in the bottom of the slide 7 so that the slide 7 and rod 11 operate as a unit.

Figure 6:
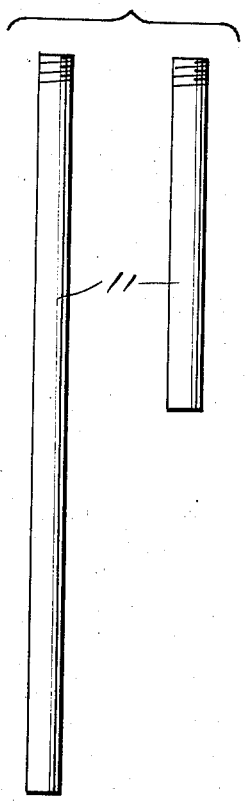
Figure 6 is an elevational view of rods showing various lengths of rods which may be employed with the gauge.

The rod 11 may, as suggested in Figure 6, be relatively short or relatively long dependent upon the work to be made the subject of measurement.

The slide 7 is provided on the periphery thereof with a longitudinal groove 13 that accommodates the inner end of a set screw 14. Screw 14 coacts with the groove 13 to retain the slide 7 against rotative movement within the chamber 3, and obviously when threaded into binding engagement with the slide 7 also acts to secure the slide against longitudinal shifting movement within the chamber 3.

In operation the device is simple, fast, positive, and accurate as will be evidenced from the following:

In use, rod 11 of the desired length has its end 12 threaded into engagement with the slide 7. The stock 2 is then placed against the work suggested, for purposes of illustration, by broken lines in Figure 1, and indicated by the reference numeral 15, with the flat side 1 of the stock 2 resting flatly against the side of the work 15 inwardly from which the opening 16 extends. Obviously the rod 11 extends into the opening 16 and with the screw 14 loose spring 9 will expand to force the slide 7 downwardly within the chamber 3 and the rod 11 inwardly of the hole 16 to engage the inner or bottom wall of the hole, when the screw 14 is then threaded home against the slide 7 to secure the slide 7 and gauge stock 2 against relative movement. The gauge stock is then removed from the work 15, and a micrometer caliper is then used to determine the distance between the free end of the rod 11 and the formation 6 on cap 5, an outside micrometer caliper being used for this purpose.

The distance from the formation 6 to the bottom or space 1 of the gauge stock 2 being known, as for example being one inch, the same is subtracted from the micrometer caliper reading to determine the correct depth of the hole, shoulder, or the like as the case may be.

When it is desired to use the gauge as a solid depth gauge, the micrometer caliper is used for first setting the gauge, and after the gauge has been so set the screw 14 is threaded home against slide 7 to secure the latter at the proper position of adjustment within the chamber 3 of the gauge stock.

In actual practice it will be found convenient to have the telescoping action, that is to say the sliding action of the slide 7 within the recess 3 confined to a range of one-half inch, while the extension rods 11 may vary in length by one-half inch to the end that measurements may be made from a zero point to any desired length.

Also in practice the gauge stock 2 and the cap 5 are formed of some hard material with the bottom 1 of the gauge stock 2 and the formation 6 on the cap 5 being ground. Compensation for wear on the only wearing parts, namely the bottom 1 of the stock 2, and the formation 6 on the cap 5, can be made by inserting shims between the shoulder at the base of the neck 4 and the rim or skirt of the cap 5.

It is thought that a clear understanding of the construction, utility and advantages of a gauge of this character will be had without a more detailed description.

Having thus described the invention what is claimed as new is:

A gauge comprising an elongated stock having a straight edge, and provided in the transverse center thereof with a cylindrical chamber opening at one end onto its opposite edge, and an opening extending from the other end of said chamber to said straight edge, a cap threaded onto said stock and closing said open end of the chamber, a slide fitting into the chamber for endwise movement therein in opposite directions toward and from said straight edge, respectively, a spring interposed between said cap and slide and opposing movement of the slide from said straight edge, a rod slidably extended through said opening and detachably secured at one end to said slide, and a set screw extending through the stock into said chamber for adjustment against the slide to lock the same against movement.

LE ROY BENNETT.